(12) United States Patent
Zhang et al.

(10) Patent No.: US 8,268,945 B2
(45) Date of Patent: Sep. 18, 2012

(54) CATALYST COMPONENT FOR ETHYLENE POLYMERIZATION, PREPARATION THEREOF, AND A CATALYST COMPRISING THE CATALYST COMPONENT

(75) Inventors: Taoyi Zhang, Beijing (CN); Junling Zhou, Beijing (CN); Hongtao Wang, Beijing (CN); Zifang Guo, Beijing (CN); Qingqiang Gou, Beijing (CN); Hongxu Yang, Beijing (CN); Ruixia Li, Beijing (CN); Shiyuan Xu, Beijing (CN)

(73) Assignees: China Petroleum & Chemical Corporation, Beijing (CN); Beijing Research Institute of Chemical Industry, China Petroleum & Chemical Corporation, Beijing (CN)

( * ) Notice: Subject to any disclaimer, the term of this patent is extended or adjusted under 35 U.S.C. 154(b) by 24 days.

(21) Appl. No.: 12/860,384

(22) Filed: Aug. 20, 2010

(65) Prior Publication Data

US 2011/0046325 A1 Feb. 24, 2011

(30) Foreign Application Priority Data

Aug. 21, 2009 (CN) .......................... 2009 1 0163054
Sep. 10, 2009 (CN) .......................... 2009 1 0170279

(51) Int. Cl.
*C08F 4/44* (2006.01)
*C08F 4/02* (2006.01)
*C08F 4/60* (2006.01)
*B01J 31/00* (2006.01)
*B01J 37/00* (2006.01)

(52) U.S. Cl. ...................... 526/124.8; 502/103; 502/118; 502/115; 502/116; 502/117; 502/121; 502/125

(58) Field of Classification Search ............... 526/124.8; 502/103, 118, 115, 116, 117, 121, 125
See application file for complete search history.

(56) References Cited

U.S. PATENT DOCUMENTS

| | | | |
|---|---|---|---|
| 4,442,276 A | 4/1984 | Kashiwa et al. | |
| 4,784,983 A * | 11/1988 | Mao et al. ..................... | 502/111 |
| 5,410,002 A | 4/1995 | Govoni et al. | |
| 5,498,770 A | 3/1996 | Hosaka et al. | |
| 5,661,095 A | 8/1997 | Meverden et al. | |
| 5,770,540 A | 6/1998 | Garoff et al. | |
| 5,798,314 A | 8/1998 | Spencer et al. | |
| 5,798,424 A | 8/1998 | Kong et al. | |
| 5,844,046 A | 12/1998 | Ohgizawa et al. | |
| 6,034,025 A | 3/2000 | Yang et al. | |
| 6,156,690 A | 12/2000 | Hosaka | |
| 6,228,793 B1 | 5/2001 | Hosaka et al. | |
| 6,337,377 B1 | 1/2002 | Ebara et al. | |
| 6,362,124 B1 | 3/2002 | Kuribayashi et al. | |
| 6,388,028 B2 | 5/2002 | Sacchetti et al. | |
| 6,410,663 B2 | 6/2002 | Shamshoum et al. | |
| 6,469,112 B2 | 10/2002 | Cheng et al. | |
| 6,559,249 B2 | 5/2003 | Yang et al. | |
| 6,566,294 B2 | 5/2003 | Miro | |
| 6,617,278 B1 | 9/2003 | Jin et al. | |
| 6,716,924 B2 | 4/2004 | Tsutsui et al. | |
| 6,762,145 B2 | 7/2004 | Yang et al. | |
| 6,803,427 B2 | 10/2004 | Yang et al. | |
| 6,806,222 B2 | 10/2004 | Yashiki et al. | |
| 6,982,237 B2 | 1/2006 | Wagner et al. | |
| 6,989,342 B2 | 1/2006 | Yang et al. | |
| 7,009,015 B2 | 3/2006 | Evain et al. | |
| 7,019,097 B2 | 3/2006 | Sacchetti et al. | |
| 7,091,289 B2 | 8/2006 | Wang et al. | |
| 7,141,634 B2 | 11/2006 | Hosaka et al. | |
| 7,153,804 B2 | 12/2006 | Chen et al. | |
| 7,323,431 B2 | 1/2008 | Gao et al. | |
| 7,326,757 B2 | 2/2008 | Zhu et al. | |
| 7,427,653 B2 | 9/2008 | Brita et al. | |
| 7,601,423 B2 | 10/2009 | Nakayama et al. | |
| 7,718,565 B2 | 5/2010 | Kang et al. | |
| 7,754,833 B2 | 7/2010 | Kim et al. | |

(Continued)

FOREIGN PATENT DOCUMENTS

CN 85100997 A 1/1987

(Continued)

OTHER PUBLICATIONS

European Search Report for European Patent Application No. 10173542.1-1214 mailed Dec. 6, 2010.
English abstract of CN 85100997A from the espacenet database.
English abstract of CN 1229092A from the espacenet database.
English abstract of CN 1958620A from the espacenet database.
English abstract of JP 54-040293 from the espacenet database.
English abstract of JP 58-019307from the espacenet database.
English abstract of JP 58-083006from the espacenet database.

*Primary Examiner* — William Cheung
(74) *Attorney, Agent, or Firm* — Finnegan, Henderson, Farabow, Garrett & Dunner, L.L.P.

(57) ABSTRACT

A catalyst component for ethylene polymerization, comprising an organic silicon compound of the formula (I), below wherein $R_1$ is chosen from $C_3$-$C_{20}$ aliphatic hydrocarbyl groups, and is substituted with at least one substituent chosen from halogens, $C_1$-$C_6$ acyloxy groups, epoxy, amino, $C_1$-$C_6$ alkylamino groups, di($C_1$-$C_6$ alkyl)amino groups, $C_1$-$C_6$ alkoxy groups, and oxo group; $R_2$, $R_3$ and $R_4$, which may be the same or different, are each chosen from $C_1$-$C_{10}$ aliphatic hydrocarbyl, $C_3$-$C_{10}$ alicyclic hydrocarbyl, $C_6$-$C_{10}$ aryl, $C_7$-$C_{10}$ aralkyl, and $C_7$-$C_{10}$ alkaryl groups. A process for preparing the catalyst component and an active catalyst comprising the catalyst component and useful in polymerization, such as ethylene polymerization.

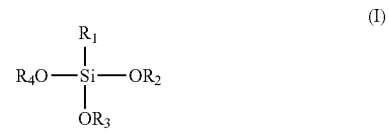

(I)

15 Claims, No Drawings

U.S. PATENT DOCUMENTS

| | | |
|---|---|---|
| 2002/0028893 A1 | 3/2002 | Cheng et al. |
| 2002/0086794 A1 | 7/2002 | Sacchetti et al. |
| 2004/0138054 A1 | 7/2004 | Wagner et al. |
| 2004/0242409 A1 | 12/2004 | Yang et al. |
| 2005/0250918 A1 | 11/2005 | Hosaka et al. |
| 2006/0003888 A1 | 1/2006 | Yang et al. |
| 2006/0142146 A1 | 6/2006 | Gao et al. |
| 2007/0021295 A1 | 1/2007 | Morini et al. |
| 2009/0171044 A1 | 7/2009 | Spencer |
| 2009/0318643 A1 | 12/2009 | Chen et al. |
| 2010/0222528 A1 | 9/2010 | Fushimi et al. |
| 2010/0240845 A1 | 9/2010 | Collina et al. |
| 2010/0292420 A1 | 11/2010 | Fushimi et al. |
| 2010/0324240 A1 | 12/2010 | Fushimi et al. |
| 2011/0046325 A1 | 2/2011 | Zhang et al. |
| 2011/0237764 A1 | 9/2011 | Gu et al. |

FOREIGN PATENT DOCUMENTS

| | | |
|---|---|---|
| CN | 1229092 A | 9/1999 |
| CN | 1958620 A | 5/2007 |
| EP | 1 947 123 A1 | 7/2008 |
| JP | 54-040293 | 3/1979 |
| JP | 58-019307 | 2/1983 |
| JP | 58-083006 | 5/1983 |

* cited by examiner

CATALYST COMPONENT FOR ETHYLENE POLYMERIZATION, PREPARATION THEREOF, AND A CATALYST COMPRISING THE CATALYST COMPONENT

The present application claims the benefit of the Chinese Patent Application No. 200910163054.9, filed on Aug. 21, 2009, and the Chinese Patent Application No. 200910170279.7, filed on Sep. 10, 2009.

The present disclosure relates to a catalyst component for ethylene polymerization, a process for preparing the same, a catalyst comprising the same, and the use of the catalyst in polymerization, such as ethylene polymerization.

It is known that catalyst systems containing titanium and magnesium are commonly used in commercial production of polyolefin. The research on such catalysts focuses mainly on catalytic activity, particle morphology and particle size distribution of the catalysts, hydrogen response of the catalysts, and copolymerization properties of the catalysts.

In an effort to obtain catalysts having uniform particle diameter and desirable particle morphology, dissolution-precipitation processes are generally utilized to prepare the catalysts. In those processes, a magnesium compound is first dissolved in a solvent to form a solution, then a titanium compound is added to the solution, and finally solid catalyst component particles are precipitated from the solution. See, e.g. JP 54-40293, JP 56-811, JP 58-83006, JP 58-19307, U.S. Pat. No. 4,784,983, CN1006071B, CN1086191C, and CN1958620A.

Disclosed herein is the surprising finding that a catalyst component for ethylene polymerization can be prepared by a dissolution-precipitation process, which uses a silane compound as an auxiliary precipitant. Such catalyst component, when used in ethylene polymerization, can exhibit a high catalytic activity and good hydrogen response and can give arise to a polymer having a narrow particle size distribution, few fines (e.g., particles having a diameter of less than 74 microns, i.e., greater than 200 mesh), and high bulk density. Furthermore, when an organic borate compound capable of reacting with water and thereby removing water as an impurity present in the reaction system is further used in the process for the preparation of the catalyst component, the operation for dewatering a solvent used in the catalyst preparation process can be simplified. Thus, the catalyst preparation process can have at least one of the following advantages chosen, for example, from convenient operation, low consumption of raw materials, high equipment utilization rate, and low environmental pollution.

Disclosed herein is a catalyst component for ethylene polymerization, comprising at least one entity chosen from reaction products of (1) at least one magnesium complex obtained by dissolving at least one magnesium halide in at least one solvent system;

(2) at least one titanium compound; and (3) at least one organic silicon compound of formula (I) defined below.

Also disclosed herein is a catalyst component, comprising at least one entity chosen from reaction products of (1) at least one magnesium complex obtained by dissolving at least one magnesium halide in at least one solvent system;

(2) at least one titanium compound of formula $Ti(OR)_aX_b$, wherein R, which may be the same or different, is chosen from $C_1$-$C_{14}$ hydrocarbyl groups, X, which may be the same or different, is chosen from halogens, a is 0, 1, 2, 3 or 4, b is 1, 2, 3 or 4, and a+b=3 or 4; and (3) at least one organic silicon compound of formula (I):

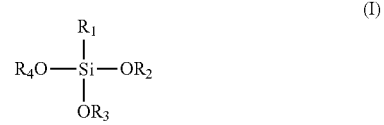

wherein $R_1$ is chosen from $C_3$-$C_{20}$ aliphatic hydrocarbyl groups, and is substituted with at least one substituent chosen from halogens, $C_1$-$C_6$ acyloxy groups, epoxy group, amino group, $C_1$-$C_6$ alkylamino groups, di($C_1$-$C_6$ alkyl)amino groups, $C_1$-$C_6$ alkoxy groups, glycidoxy group, and oxo group; $R_2$, $R_3$ and $R_4$, which may be the same or different, are each chosen from $C_1$-$C_{10}$ aliphatic hydrocarbyl, $C_3$-$C_{10}$ alicyclic hydrocarbyl, $C_6$-$C_{10}$ aryl, $C_7$-$C_{10}$ aralkyl, and $C_7$-$C_{10}$ alkaryl groups, said reaction products being useful as catalyst components for ethylene polymerization.

Further disclosed herein is a method for preparing the catalyst component.

Even further disclosed herein is a catalyst for ethylene polymerization, comprising at least one entity chosen from reaction products of (1) the catalyst component as disclosed herein and (2) at least one organoaluminum cocatalyst.

Even further disclosed herein is a process for ethylene polymerization, comprising (i) contacting ethylene and optionally at least one comonomer with the catalyst disclosed herein under polymerization conditions sufficient to form a polymer; and (ii) recovering the polymer formed in operation (i).

The term "polymerization" as used herein includes both homopolymerization and copolymerization. The term "polymer" as used herein includes homopolymer, copolymer and terpolymer.

As used herein, the term "catalyst component" means main catalyst component or procatalyst, which may be used with, for example, a conventional cocatalyst such as an alkylaluminum to provide a catalyst for ethylene polymerization as disclosed herein.

Disclosed herein is a catalyst component for ethylene polymerization, comprising at least one entity chosen from reaction products of (1) at least one magnesium complex obtained by dissolving at least one magnesium halide in at least one solvent system;

(2) at least one titanium compound of formula $Ti(OR)_aX_b$, wherein R, which may be the same or different, is chosen from $C_1$-$C_{14}$ hydrocarbyl groups, X, which may be the same or different, is chosen from halogens, a is 0, 1, 2, 3 or 4, b is 1, 2, 3 or 4, and a+b=3 or 4; and (3) at least one organic silicon compound of formula (I):

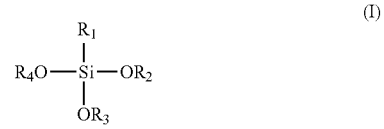

wherein $R_1$ is chosen from $C_3$-$C_{20}$ aliphatic hydrocarbyl groups, and is substituted with at least one substituent chosen from halogens, $C_1$-$C_6$ acyloxy groups, epoxy group, amino group, $C_1$-$C_6$ alkylamino groups, di($C_1$-$C_6$ alkyl)amino groups, $C_1$-$C_6$ alkoxy groups, glycidoxy group, and oxo group; $R_2$, $R_3$ and $R_4$, which may be the same or different, are each chosen from $C_1$-$C_{10}$ aliphatic hydrocarbyl groups, $C_3$-$C_{10}$ alicyclic hydrocarbyl groups, $C_6$-$C_{10}$ aryl groups, $C_7$-$C_{10}$ aralkyl groups, and $C_7$-$C_{10}$ alkaryl groups.

In an embodiment, the magnesium halide is chosen from magnesium dihalides, hydrates of magnesium dihalides, alcohol complexes of magnesium dihalides, derivatives of magnesium dihalides wherein at least one halogen atom in the magnesium dihalide molecule is replaced with an alkoxy or a halogenated alkoxy group, and mixtures thereof. For example, the magnesium halide may be chosen from magnesium dihalides, hydrates of magnesium dihalides, alcohol complexes of magnesium dihalides, and mixtures thereof. The magnesium halide may be further chosen, for example, from magnesium dichloride, magnesium dibromide, magnesium diiodium, phenoxy magnesium chloride, isopropoxy magnesium chloride, butoxy magnesium chloride, and mixtures thereof.

In an embodiment, the solvent system comprises at least one organic epoxy compound, at least one organic boron compound, at least one alcohol, and optionally at least one inert diluent. In another embodiment, the solvent system comprises at least one organic epoxy compound, at least one organophosphorus compound, at least one alcohol, and optionally at least one inert diluent.

The organic epoxy compounds herein may be chosen, for example, from aliphatic epoxy compounds and diepoxy compounds, halogenated aliphatic epoxy compounds and diepoxy compounds, glycidyl ether, and inner ethers, each comprising from 2 to 8 carbon atoms. As used herein, the term "inner ethers" means compounds comprising carbon-oxygen rings with one cyclic oxygen per ring (known as an oxido ring). In one embodiment, the organic epoxy compounds are chosen from epoxy ethane, epoxy propane, epoxy butane, vinyl epoxy ethane, butadiene dioxide, epoxy chloropropane, glycidyl methyl ether, diglycidyl ether, and tetrahydrofuran. In another embodiment, the organic epoxy compound is epoxy chloropropane. Those organic epoxy compounds may be used alone or in combination.

The organophosphorus compounds herein are chosen, for example, from hydrocarbyl esters of phosphoric acid, halogenated hydrocarbyl esters of phosphoric acid, hydrocarbyl esters of phosphorous acid, and halogenated hydrocarbyl esters of phosphorous acid. In one embodiment, the organophosphorus compounds are chosen from trimethyl phosphate, triethyl phosphate, tributyl phosphate, triphenyl phosphate, trimethyl phosphite, triethyl phosphite, tributyl phosphate, and tribenzyl phosphite. In another embodiment, the organophosphorus compound is tributyl phosphate. Those organophosphorus compounds may be used alone or in combination.

In an embodiment, the at least one organic boron compound is of the formula (II):

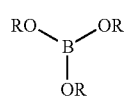

(II)

wherein R, which may be the same or different, is chosen from $C_1$-$C_{20}$ linear alkyl and $C_3$-$C_{20}$ branched alkyl, $C_3$-$C_{20}$ cycloalkyl, $C_6$-$C_{20}$ aryl, $C_7$-$C_{20}$ aralkyl, and $C_7$-$C_{20}$ alkaryl groups. In another embodiment, the at least one organic boron compound is of the formula (II), wherein R, which may be the same or different, is chosen from $C_1$-$C_{20}$ linear alkyl groups. For example, the at least one organic boron compound may be chosen from triethyl borate, tripropyl borate, tributyl borate, tri-iso-butyl borate, tri-tert-butyl borate, triamyl borate, tri-isoamyl borate, trihexyl borate, tri(2-ethylbutyl)borate, triheptyl borate, trioctyl borate, tri(2-ethylhexyl)borate, trinonyl borate, tris-decyl borate, and tris(lauryl)borate. The organic boron compound can be introduced into the reaction system as such or as a combination, such as a reaction product, of at least one boron halide and at least one hydroxyl-carrying compound.

In an embodiment, the at least one alcohol is chosen from optionally halogenated linear $C_1$-$C_{10}$ alkyl alcohols, optionally halogenated branched $C_3$-$C_{10}$ alkyl alcohols, optionally halogenated $C_3$-$C_{10}$ cycloalkyl alcohols, optionally halogenated $C_6$-$C_{20}$ aryl alcohols, optionally halogenated $C_7$-$C_{20}$ aralkyl alcohols, and optionally halogenated $C_7$-$C_{20}$ alkaryl alcohols. For example, the at least one alcohol is chosen from aliphatic alcohols, such as methanol, ethanol, propanol, isopropanol, butanol, isobutanol, glycerol, hexanol, 2-methylpentanol, 2-ethylbutanol, n-heptanol, 2-ethylhexanol, n-octanol, and decanol; cycloalkyl alcohols, such as cyclohexanol and methylcyclohexanol; aromatic alcohols, such as phenylmethanol, tolylmethanol, α-methylphenylmethanol, α,α-dimethylphenylmethanol, isopropylphenylmethanol, and phenylethanol; halogenated alcohols, such as 3,3,3-trichloroethanol and 6,6,6-trichlorohexanol. In another embodiment, the at least one alcohol is chosen from ethanol, butanol, 2-ethylhexanol and glycerin.

In order to dissolve the magnesium halide, the solvent system optionally comprises at least one inert diluent. The inert diluent may comprise at least one aromatic hydrocarbon or at least one alkane, as long as it can facilitate the dissolution of the magnesium halide. The at least one aromatic hydrocarbon may be chosen, for example, from benzene, toluene, xylene, chlorobenzene, dichlorobenzene, trichlorobenzene, chlorotoluene, and derivatives thereof. The at least one alkane may be chosen, for example, from linear $C_1$-$C_{20}$ alkanes, branched $C_3$-$C_{20}$ alkanes and $C_3$-$C_{20}$ cycloalkanes, such as, butanes, pentanes, hexanes, cyclohexane, and heptanes. Those inert diluents may be used alone or in combination. The amount of the inert diluent, if used, is not specially limited. However, from the viewpoint of easiness of operation and economical efficiency, it may, for example, be used in an amount of from 0.2 to 10.0 liters relative to one mole of the magnesium halide.

In the formation of the magnesium complex, the amounts of the individual ingredient used may be as follows: from 0.2 to 10.0 moles, such as from 0.3 to 4.0 moles, of the at least one organic epoxy compound; from 0.1 to 10.0 moles, such as from 0.2 to 4.0 moles, of the at least one organic boron compound or the at least one organophosphorus compound; and from 0.1 to 10.0 moles, such as from 1.0 to 4.0 moles, of the at least one alcohol compound, all relative to one mole of the magnesium halide.

In an embodiment, the titanium compound can be chosen from titanium tetrachloride, titanium tetrabromide, titanium tetraiodide, tetrabutoxy titanium, tetraethoxy titanium, triethoxy titanium chloride, diethoxy titanium dichloride, ethoxy titanium trichloride, titanium trichloride, and mixtures thereof.

In another embodiment, the at least one organic silicon compound is of the formula (I), wherein $R_1$ is chosen from $C_3$-$C_{20}$ linear and branched alkyl groups, and is substituted with at least one substituent chosen from Cl, Br, $C_1$-$C_6$ acyloxy groups, epoxy group, amino group, $C_1$-$C_6$ alkylamino groups, di($C_1$-$C_6$ alkyl)amino groups, $C_1$-$C_6$ alkoxy groups, glycidoxy group, and oxo group; and $R_2$, $R_3$ and $R_4$ are each chosen from $C_1$-$C_{10}$ linear alkyl, $C_3$-$C_{10}$ branched alkyl, and $C_3$-$C_{10}$ cycloalkyl groups.

For example, the organic silicon compounds may be chosen from γ-chloropropyltrimethoxysilane, γ-chlorobutyltrimethoxysilane, γ-chlorohexyltrimethoxysilane, γ-chlorooctyltrimethoxysilane, γ-chloropropyltriethoxysilane, γ-chlorobutyltriethoxysilane, γ-chlorohexyltriethoxysilane, γ-chlorooctyltriethoxysilane, γ-chloropropyltributoxysilane, γ-chlorobutyltributoxysilane, γ-chlorohexyltributoxysilane, γ-chlorooctyltributoxysiane, γ-acryloxypropyltrimethoxysilane, γ-acryloxybutyltrimethoxysilane, γ-acryloxyhexyltrimethoxysilane, γ-acryloxyoctyltrimethoxysilane, γ-acryloxypropyltriethoxysilane, γ-acryloxybutyltriethoxysilane, γ-acryloxyhexyltriethoxysilane, γ-acryloxyoctyltriethoxysilane, γ-acryloxypropyltributoxysilane, γ-acryloxybutyltributoxysilane, γ-acryloxyhexyltributoxysilane, γ-acryloxyoctyltributoxysilane, γ-methacryloxypropyltrimethoxysilane, γ-methacryloxybutyltrimethoxysilane, γ-methacryloxyhexyltrimethoxysilane, γ-methacryloxyoctyltrimethoxysilane, γ-methacryloxypropyltriethoxysilane, γ-methacryloxybutyltriethoxysilane, γ-methacryloxyhexyltriethoxysilane, γ-methacryloxyoctyltriethoxysilane, γ-methacryloxypropyltributoxysilane, γ-methacryloxybutyltributoxysilane, γ-methacryloxyhexyltributoxysilane, γ-methacryloxyoctyltributoxysilane, γ-(2,3-epoxypropoxy)propyltrimethoxysilane, γ-(2,3-epoxypropoxy)butyltrimethoxysilane, γ-(2,3-epoxypropoxy)hexyltrimethoxysilane, γ-(2,3-epoxypropoxy)octyltrimethoxysilane, γ-(2,3-epoxypropoxy)propyltriethoxysilane, γ-(2,3-epoxypropoxy)butyltriethoxysilane, γ-(2,3-epoxypropoxy)hexyltriethoxysilane, γ-(2,3-epoxypropoxy)octyltriethoxysilane, γ-(2,3-epoxypropoxy)propyltributoxysilane, γ-(2,3-epoxypropoxy)butyltributoxysilane, γ-(2,3-epoxypropoxy)hexyltributoxysilane, γ-(2,3-epoxypropoxy)octyltributoxysilane, γ-(N,N-dimethylaminopropyl)trimethoxysilane, γ-(N,N-diethylaminopropyl)trimethoxysilane, γ-(N,N-dipropylaminopropyl)trimethoxysilane, γ-(N,N-dibutylaminopropyl)trimethoxysilane, γ-(N,N-dimethylaminopropyl)triethoxysilane, γ-(N,N-diethylaminopropyl)triethoxysilane, γ-(N,N-dipropylaminopropyl)triethoxysilane, γ-(N,N-dibutylaminopropyl)triethoxysilane, γ-(N,N-dimethylaminopropyl)tributoxysilane, γ-(N,N-diethylaminopropyl)tributoxysilane, γ-(N,N-dipropylaminopropyl)tributoxysilane, γ-(N,N-dibutylaminopropyl)tributoxysilane, γ-(N,N-dimethylaminopropyl)trihexyloxysilane, γ-(N,N-diethylaminopropyl)trihexyloxysilane, γ-(N,N-dipropylaminopropyl)trihexyloxysilane, γ-(N,N-dibutylaminopropyl)trihexyloxysilane, γ-(N,N-dimethylaminopropyl)trioctyloxysilane, γ-(N,N-diethylaminopropyl)trioctyloxysilane, γ-(N,N-dipropylaminopropyl)trioctyloxysilane, γ-(N,N-dibutylaminopropyl)trioctyloxysilane, and mixtures thereof.

In another embodiment, the organic silicon compounds are chosen from γ-chloropropyltrimethoxysilane, γ-chloropropyltriethoxysilane, γ-acryloxypropyltrimethoxysilane, γ-acryloxypropyltriethoxy silane, γ-methacryloxypropyltrimethoxysilane, γ-methacryloxypropyltriethoxysilane, γ-(2,3-epoxypropoxy)propyltrimethoxysilane, γ-(2,3-epoxypropoxy)propyltriethoxysilane, γ-(N,N-dimethylaminopropyl)trimethoxysilane, and γ-(N,N-dimethylaminopropyl)triethoxy silane.

In a further embodiment, the organic silicon compounds are chosen from γ-methacryloxypropyltriethoxysilane, γ-(2,3-epoxypropoxy)propyltriethoxysilane, and γ-(N,N-dimethylaminopropyl)triethoxysilane.

As disclosed herein, the organic silicon compound can serve at least as an auxiliary precipitant to facilitate the formation of catalyst component particles. Without being bound by the theory, it is also believed that the use of the organic silicon compound can improve the performance of the catalyst component comprising titanium.

The at least one organic aluminum compound can be chosen, for example, from those of formula $AlR_nX_{3-n}$, wherein R, which may be the same or different, is chosen from $C_1$-$C_{20}$ hydrocarbyl groups, such as alkyl, aralkyl and aryl groups; X, which may be the same or different, is chosen from hydrogen and halogens, such as chlorine and bromine; and n is a value satisfying $1 \leq n \leq 3$. The at least one organic aluminum compound can be optionally introduced into the catalyst component disclosed herein. In one embodiment, the at least one organic aluminum compound is chosen from trialkyl aluminum compounds, such as trimethyl aluminum, triethyl aluminum, triisobutyl aluminum and trioctyl aluminum; alkyl aluminum hydrides, such as diethyl aluminum hydride and diisobutyl aluminum hydride; and alkyl aluminum halides, such as diethyl aluminum chloride, di-isobutyl aluminum chloride, ethyl aluminum sesquichloride and ethyl aluminum dichloride. In another embodiment, the at least one organic aluminum compound is chosen from alkyl aluminum halides, such as diethyl aluminum chloride. These organic aluminum compounds may be used alone or in combination. Adding an appropriate amount of the organic aluminum compound into the catalyst component may contribute to the improvement of the activity and hydrogen response of the catalyst component, whereas adding an excessive amount of organic aluminum compound into the catalyst component may inhibit the activity of the catalyst component, and make the reaction system viscous, thereby going against the precipitation of the catalyst component. Therefore, the amount of the organic aluminum compound used may, for example, range from 0 to 5 moles, relative to one mole of the magnesium halide.

As indicated above, the catalyst component for ethylene polymerization as disclosed herein comprises at least one entity chosen from reaction products of the at least one magnesium complex, the at least one titanium compound, the at least one organic silicon compound, and optionally the at least one organic aluminum compound, wherein the amounts of the individual reactants used may be as follows: from 0.05 to 1.0 moles, such as from 0.2 to 0.8 moles, of the organic silicon compound; from 0 to 5.0 moles of the organic aluminum compound; and from 1.0 to 15.0 moles, such as from 2.0 to 10.0 moles, of the titanium compound, all relative to one mole of the magnesium halide in the magnesium complex.

In an embodiment, the catalyst component disclosed herein consists essentially of the aforesaid reaction product. Such a catalyst component may, for example, comprise: Ti: 4.5 to 8.5 wt %, Mg: 13.0 to 19.0 wt %, Cl: 57.0 to 69.0 wt %, Si: 0.2 to 1.2 wt %, alkoxy group: 4.0 to 8.5 wt %, B/P: 0.1 to 1.0 wt %, and Al: 0 to 2.0 wt %, relative to the total weight of the catalyst component.

Further disclosed herein is a process for preparation of the catalyst component as disclosed herein, comprising
  (1) dissolving at least one magnesium halide in at least one solvent system, comprising at least one organic epoxy compound, at least one organic boron compound, at least one alcohol, and optionally at least one inert diluent, or comprising at least one organic epoxy compound, at least one organophosphorus compound, at least one alcohol, and optionally at least one inert diluent, at a temperature ranging from 40° C. to 100° C., to form a solution, such as a homogeneous solution;

(2) combining the solution of operation (1) with at least one titanium compound and at least one organic silicon compound at a temperature ranging from −40° C. to 10° C., to form a mixture;

(3) heating the mixture of the operation (2) to a temperature ranging from 40° C. to 120° C. over a period of time, such as from 0.5 to 3 hours, and maintaining at that temperature for a period of time, such as from 0.5 to 3 hours, to precipitate solids; and (4) recovering the solids as the catalyst component.

Even further disclosed is a process for preparing a catalyst component comprising at least one entity chosen from reaction products of (a) at least one magnesium complex obtained by dissolving at least one magnesium halide in at least one solvent system;

(b) at least one titanium compound of formula $Ti(OR)_aX_b$, wherein R, which may be the same or different, is chosen from $C_1$-$C_{14}$ hydrocarbyl groups, X, which may be the same or different, is chosen from halogens, a is 0, 1, 2, 3 or 4, b is 1, 2, 3 or 4, and a+b=3 or 4; and (c) at least one organic silicon compound of formula (I):

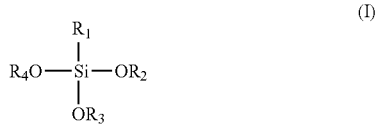

wherein $R_1$ is chosen from $C_3$-$C_{20}$ aliphatic hydrocarbyl groups, and is substituted with at least one substituent chosen from halogens, $C_1$-$C_6$ acyloxy groups, epoxy group, amino group, $C_1$-$C_6$ alkylamino groups, di($C_1$-$C_6$ alkyl)amino groups, $C_1$-$C_6$ alkoxy groups, glycidoxy group, and oxo group; $R_2$, $R_3$ and $R_4$, which may be the same or different, are each chosen from $C_1$-$C_{10}$ aliphatic hydrocarbyl, $C_3$-$C_{10}$ alicyclic hydrocarbyl, $C_6$-$C_{10}$ aryl, $C_7$-$C_{10}$ aralkyl, and $C_7$-$C_{10}$ alkaryl groups, said reaction products being useful as catalyst components for ethylene polymerization; comprising (1) dissolving the at least one magnesium halide in the at least one solvent system to form a solution;

(2) combining the solution of operation (1) with the at least one titanium compound and the at least one organic silicon compound at a temperature ranging from −40° C. to 10° C. to form a mixture;

(3) heating the mixture of operation (2) to a temperature ranging from 40° C. to 120° C. and maintaining at that temperature for a period of time, to precipitate solids; and (4) recovering the solids as the catalyst component.

The ingredients used in the process are as described above for the catalyst component disclosed herein.

In operation (1), the amounts of the individual ingredients used are as described above for the magnesium complex. The temperature for dissolution may range, for example, from 40° C. to 100° C., such as from 50° C. to 90° C. The time period for which operation (1) is conducted is not specially limited. However, it is generally a period of time, such as from 20 minutes to 5 hours, and further such as from 30 minutes to 2 hours, after the solution has become clear.

In operation (2), the solution obtained in operation (1) is combined with the at least one titanium compound and the at least one organic silicon compound. The order for combining the three ingredients is not crucial. For example, in one embodiment, the solution obtained in operation (1) is combined first with the at least one titanium compound and then with the at least one organic silicon compound at a temperature ranging from −40° C. to 10° C. In another embodiment, the solution obtained in operation (1) is combined first with the at least one organic silicon compound and then with the at least one titanium compound at a temperature ranging from −40° C. to 10° C. Relative to one mole of the magnesium halide in the magnesium complex, the amount of the organic silicon compound may range, for example, from 0.05 to 1.0 moles, such as from 0.2 to 0.8 moles, and the amount of the titanium compound may range, for example, from 1.0 to 15.0 moles, such as from 2.0 to 10.0 moles.

The recovering operation (4) can be performed according to conventional processes known in the art. In general, the recovering operation may include, for example, filtering, washing the filter cake with at least one inert solvent such as hexane, and optionally drying the solids.

Further disclosed herein is a catalyst for ethylene polymerization, comprising at least one entity chosen from reaction products of:

(1) the catalyst component disclosed herein; and (2) at least one organic aluminum compound of formula $AlR_nX_{3-n}$, wherein R, which may be the same or different, is chosen from hydrocarbyl groups, such as $C_1$-$C_{20}$ alkyl, $C_7$-$C_{20}$ aralkyl, and $C_6$-$C_{20}$ aryl groups; X, which may be the same or different, is chosen from hydrogen and halogens, such as Cl and Br; and n has a value satisfying $1 \leq n \leq 3$.

Even further disclosed is a catalyst comprising at least one entity chosen from reaction products of (1) at least one catalyst component comprising at least one entity chosen from reaction products of (a) at least one magnesium complex obtained by dissolving at least one magnesium halide in at least one solvent system;

(b) at least one titanium compound of formula $Ti(OR)_aX_b$, wherein R, which may be the same or different, is chosen from $C_1$-$C_{14}$ hydrocarbyl groups, X, which may be the same or different, is chosen from halogens, a is 0, 1, 2, 3 or 4, b is 1, 2, 3 or 4, and a+b=3 or 4; and (c) at least one organic silicon compound of formula (I):

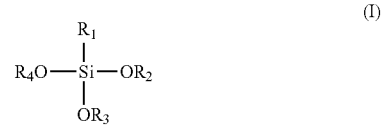

wherein $R_1$ is chosen from $C_3$-$C_{20}$ aliphatic hydrocarbyl groups, and is substituted with at least one substituent chosen from halogens, $C_1$-$C_6$ acyloxy groups, epoxy group, amino group, $C_1$-$C_6$ alkylamino groups, di($C_1$-$C_6$ alkyl)amino groups, $C_1$-$C_6$ alkoxy groups, glycidoxy group, and oxo group; $R_2$, $R_3$ and $R_4$, which may be the same or different, are each chosen from $C_1$-$C_{10}$ aliphatic hydrocarbyl, $C_3$-$C_{10}$ alicyclic hydrocarbyl, $C_6$-$C_{10}$ aryl, $C_7$-$C_{10}$ aralkyl, and $C_7$-$C_{10}$ alkaryl groups, said reaction products being useful as catalyst components for ethylene polymerization; and (2) at least one organic aluminum compound of formula $AlR_nX_{3-n}$, wherein R, which may be the same or different, is chosen from $C_1$-$C_{20}$ hydrocarbyl groups, X, which may be the same or different, is chosen from hydrogen and halogens, and n has a value satisfying $1 \leq n \leq 3$, wherein said catalyst is useful for ethylene polymerization.

In an embodiment, the at least one organic aluminum compound is chosen from trialkyl aluminum compounds, such as trimethyl aluminum, triethyl aluminum, triisobutyl aluminum, tri-n-butyl aluminum, tri-n-hexyl aluminum, tri-n-octyl aluminum; alkyl aluminum hydrides, such as diethyl aluminum hydride, diisobutyl aluminum hydride; alkyl aluminum halides, such as diethyl aluminum chloride, di-isobutyl aluminum chloride, ethyl aluminum sesquichloride, and ethyl aluminum dichloride. For example, the at least one organic aluminum compound is chosen from trialkyl aluminum compounds, such as from triethyl aluminum and triisobutyl aluminum.

In the catalyst as disclosed herein, the molar ratio of aluminum in the organic aluminum compound to titanium in the catalyst component may range, for example, from 5:1 to 500:1, such as from 20:1 to 200:1.

Even further disclosed is a catalyst comprising:
(1) at least one catalyst component comprising at least one entity chosen from reaction products of
  (a) at least one magnesium complex obtained by dissolving at least one magnesium halide in at least one solvent system;
  (b) at least one titanium compound of formula $Ti(OR)_aX_b$, wherein R, which may be the same or different, is chosen from $C_1$-$C_{14}$ hydrocarbyl groups, X, which may be the same or different, is chosen from halogens, a is 0, 1, 2, 3 or 4, b is 1, 2, 3 or 4, and a+b=3 or 4; and
  (c) at least one organic silicon compound of formula (I):

wherein $R_1$ is chosen from $C_3$-$C_{20}$ aliphatic hydrocarbyl groups, and is substituted with at least one substituent chosen from halogens, $C_1$-$C_6$ acyloxy groups, epoxy group, amino group, $C_1$-$C_6$ alkylamino groups, di($C_1$-$C_6$ alkyl)amino groups, $C_1$-$C_6$ alkoxy groups, glycidoxy group, and oxo group; $R_2$, $R_3$ and $R_4$, which may be the same or different, are each chosen from $C_1$-$C_{10}$ aliphatic hydrocarbyl, $C_3$-$C_{10}$ alicyclic hydrocarbyl, $C_6$-$C_{10}$ aryl, $C_7$-$C_{10}$ aralkyl, and $C_7$-$C_{10}$ alkaryl groups, said reaction products being useful as catalyst components for ethylene polymerization; and
(2) at least one co-catalyst;
wherein said catalyst is useful for ethylene polymerization.

Even further disclosed herein is a process for polymerization of ethylene, comprising contacting, under polymerization conditions, ethylene and optionally at least one $C_3$-$C_{20}$ α-olefin as a comonomer with the catalyst disclosed herein; and recovering the resulting polymer. The at least one α-olefin that is copolymerizable with ethylene may be chosen, for example, from propylene, 1-butene, 4-methyl-1-pentene, 1-hexene, 1-octene, 1-decene, and 1-dodecene.

The polymerization process can be carried out in liquid phase and/or gas phase. The catalyst disclosed herein can, for example, be suitable for a slurry polymerization process, or a combined polymerization process including slurry phase polymerization, for example, a process comprising slurry phase polymerization and gas phase polymerization.

Even further disclosed is a process for polymerization of ethylene, comprising (i) contacting, under polymerization conditions, ethylene and optionally at least one $C_3$-$C_{20}$ α-olefin as a comonomer with a catalyst comprising at least one entity chosen from reaction products of:
(1) at least one catalyst component comprising at least one entity chosen from reaction products of
  (a) at least one magnesium complex obtained by dissolving at least one magnesium halide in at least one solvent system;
  (b) at least one titanium compound of formula $Ti(OR)_aX_b$, wherein R, which may be the same or different, is chosen from $C_1$-$C_{14}$ hydrocarbyl groups, X, which may be the same or different, is chosen from halogens, a is 0, 1, 2, 3 or 4, b is 1, 2, 3 or 4, and a+b=3 or 4; and
  (c) at least one organic silicon compound of formula (I):

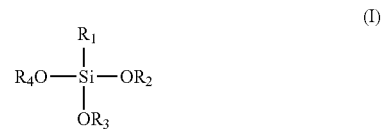

wherein $R_1$ is chosen from $C_3$-$C_{20}$ aliphatic hydrocarbyl groups, and is substituted with at least one substituent chosen from halogens, $C_1$-$C_6$ acyloxy groups, epoxy group, amino group, $C_1$-$C_6$ alkylamino groups, di($C_1$-$C_6$ alkyl)amino groups, $C_1$-$C_6$ alkoxy groups, glycidoxy group, and oxo group; $R_2$, $R_3$ and $R_4$, which may be the same or different, are each chosen from $C_1$-$C_{10}$ aliphatic hydrocarbyl, $C_3$-$C_{10}$ alicyclic hydrocarbyl, $C_6$-$C_{10}$ aryl, $C_7$-$C_{10}$ aralkyl, and $C_7$-$C_{10}$ alkaryl groups; and
(2) at least one organic aluminum compound of formula $AlR_nX_{3-n}$, wherein R, which may be the same or different, is chosen from $C_1$-$C_{20}$ hydrocarbyl groups, X, which may be the same of different, is chosen from hydrogen and halogens, and n has a value satisfying $1 \leq n \leq 3$, for a time sufficient to polymerize said ethylene; and
(ii) recovering the resulting ethylene polymer.

Yet even further disclosed is a process for polymerization of ethylene, comprising
(i) contacting, under polymerization conditions, ethylene and optionally at least one $C_3$-$C_{20}$ α-olefin as a comonomer with a catalyst comprising:
(1) at least one catalyst component comprising at least one entity chosen from reaction products of
  (a) at least one magnesium complex obtained by dissolving at least one magnesium halide in at least one solvent system;
  (b) at least one titanium compound of formula $Ti(OR)_aX_b$, wherein R, which may be the same or different, is chosen from $C_1$-$C_{14}$ hydrocarbyl groups, X, which may be the same or different, is chosen from halogens, a is 0, 1, 2, 3 or 4, b is 1, 2, 3 or 4, and a+b=3 or 4; and
  (c) at least one organic silicon compound of formula (I):

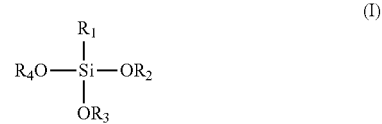

wherein $R_1$ is chosen from $C_3$-$C_{20}$ aliphatic hydrocarbyl groups, and is substituted with at least one substituent chosen from halogens, $C_1$-$C_6$ acyloxy groups, epoxy group, amino group, $C_1$-$C_6$ alkylamino groups, di($C_1$-$C_6$ alkyl)amino groups, $C_1$-$C_6$ alkoxy groups, glycidoxy group, and oxo group; $R_2$, $R_3$ and $R_4$, which may be the same or different, are each chosen from $C_1$-$C_{10}$ aliphatic hydrocarbyl, $C_3$-$C_{10}$ alicyclic hydrocarbyl, $C_6$-$C_{10}$ aryl, $C_7$-$C_{10}$ aralkyl, and $C_7$-$C_{10}$ alkaryl groups; and (2) at least one co-catalyst, for a time sufficient to polymerize said ethylene; and (ii) recovering the resulting ethylene polymer.

The media useful in the liquid phase polymerization may be chosen, for example, from saturated aliphatic and aromatic inert solvents, such as isobutane, hexane, heptane, cyclohexane, naphtha, raffinate, hydrogenated gasoline, kerosene, benzene, toluene, and xylene.

In order to regulate the molecular weight of the final polymers, hydrogen gas can, for example, be used as a molecular weight regulator in the polymerization process disclosed herein.

The disclosure herein may have at least one of the following advantages: (1) due to the use of the organic boron compound, which can react with water and thus serve as a scavenger to remove impurity water present in the reaction system, in the preparation of the catalyst component disclosed herein, the solvent dewatering process in the catalyst preparation can be simplified; (2) the use of the organic silicon compound comprising at least one functional group as an auxiliary precipitant can facilitate the precipitation of the catalyst component particles, so that a large quantity of titanium tetrachloride may not be needed to precipitate the catalyst component particles; and (3) the catalysts disclosed herein may exhibit at least one of the excellent properties chosen, for example, from high catalytic activities, good hydrogen response, narrow particle size distribution of the resulting polymer, few polymer fines, and high polymer bulk density.

EXAMPLES

The following examples are provided to further illustrate the present disclosure and by no means are intended to limit the scope thereof.

Example 1

Preparation of a Catalyst Component

To a reactor, in which air had been repeatedly purged with pure $N_2$, were charged successively 4.0 g of anhydrous magnesium dichloride, 50 ml of toluene, 6.0 ml of epoxy chloropropane, 6.0 ml of tributyl borate, and 5.6 ml of ethanol. The reaction mixture was heated with stirring to 70° C. After the solids had been dissolved, the mixture was further maintained at 70° C. for 1 hour. The reaction mixture was cooled to −5° C., 40 ml of $TiCl_4$ was added dropwise thereto, and then 3.0 ml of γ-(N,N-dimethylaminopropyl)triethoxysilane was added thereto. The reaction mixture was allowed to react for 1 hour, and then heated slowly to 80° C. and further maintained at the temperature of 80° C. for 2 hours. The stirrer was stopped, and solids in the reaction mixture settled down quickly. Supernatant was filtered off. The residual solids were washed with toluene twice and with hexane four times, and then dried under a pure $N_2$ flow, to give a free-flowing solid catalyst component. The composition of the catalyst component is shown in Table 1 below.

Ethylene Polymerization

Under nitrogen atmosphere, about 0.5 g of the above catalyst component was dispersed in 50 ml of hexane through stirring, to form a suspension of the solid catalyst component in hexane useful in ethylene polymerization.

To a 2 L stainless steel autoclave, in which air had been sufficiently purged with pure $N_2$, were charged 1 L of hexane, 1.0 ml of 1 M solution of triethyl aluminum in hexane, and an aliquot of the suspension of the solid catalyst component in hexane prepared above (comprising 0.3 mg of Ti). The reactor was heated to 70° C., and hydrogen gas was added thereto until the pressure inside the reactor reached 0.28 MPa (gauge), then ethylene monomer was added thereto until the total pressure inside the reactor reached 0.73 MPa (gauge). The polymerization reaction was allowed to continue at 80° C. for 2 hours, with ethylene being supplied to maintain a total pressure of 0.73 MPa (gauge). The properties of the resulting polyethylene were measured and the results are shown in Table 2 below.

Example 2

A catalyst component was prepared according to the procedure described in Example 1, except that the amount of ethanol was changed to 6.9 ml, and the amount of tributyl borate was changed to 7.0 ml. The composition of the catalyst component is shown in Table 1 below.

An ethylene polymerization was carried out according to the procedure described in Example 1. The properties of the resulting polyethylene were measured, and the results are shown in Table 2 below.

Example 3

A catalyst component was prepared according to the procedure described in Example 2, except that tributyl borate was replaced with 7.0 ml of trioctyl borate. The composition of the catalyst component is shown in Table 1 below.

An ethylene polymerization was carried out according to the procedure described in Example 1. The properties of the resulting polyethylene were measured, and the results are shown in Table 2 below.

Example 4

To a reactor, in which air had been repeatedly purged with pure $N_2$, were charged successively 4.03 g of anhydrous magnesium dichloride, 50 ml of toluene, 6.0 ml of epoxy chloropropane, 6.0 ml of tributyl borate, and 5.6 ml of ethanol. The reaction mixture was heated with stirring to 70° C. After the solids had been dissolved, the mixture was further maintained at 70° C. for 1 hour. The reaction mixture was cooled to −5° C., 40 ml of $TiCl_4$ was added dropwise thereto, and then 4.5 ml of γ-methacryloxypropyltriethoxysilane was added thereto. The reaction mixture was allowed to react for 1 hour, and then heated slowly to 80° C. and further maintained at the temperature of 80° C. for 2 hours. The stirrer was stopped, and solids in the reaction mixture settled down quickly. Supernatant was filtered off. The residual solids were washed with toluene twice and with hexane four times, and then dried under a pure $N_2$ flow, to give a free-flowing solid catalyst component. The composition of the catalyst component is shown in Table 1 below.

An ethylene polymerization was carried out according to the procedure described in Example 1. The properties of the resulting polyethylene were measured and the results are shown in Table 2 below.

Example 5

A catalyst component was prepared according to the procedure described in Example 4, except that the amount of γ-methacryloxypropyltriethoxysilane was changed to 6.0 ml. The composition of the catalyst component is shown in Table 1 below.

An ethylene polymerization was carried out according to the procedure described in Example 1. The properties of the resulting polyethylene were measured and the results are shown in Table 2 below.

Example 6

A catalyst component was prepared according to the procedure described in Example 4, except that the amount of γ-methacryloxypropyltriethoxysilane was changed to 7.5 ml. The composition of the catalyst component is shown in Table 1 below.

An ethylene polymerization was carried out according to the procedure described in Example 1. The properties of the resulting polyethylene were measured and the results are shown in Table 2 below.

Example 7

A catalyst component was prepared according to the procedure described in Example 4, except that the amount of γ-methacryloxypropyltriethoxysilane was changed to 8.6 ml. The composition of the catalyst component is shown in Table 1 below.

An ethylene polymerization was carried out according to the procedure described in Example 1. The properties of the resulting polyethylene were measured and the results are shown in Table 2 below.

Example 8

A catalyst component was prepared according to the procedure described in Example 4, except that the γ-methacryloxypropyltriethoxysilane was replaced with 4.5 ml of γ-methacryloxypropyltrimethoxysilane. The composition of the catalyst component is shown in Table 1 below.

An ethylene polymerization was carried out according to the procedure described in Example 1. The properties of the resulting polyethylene were measured and the results are shown in Table 2 below.

Example 9

A catalyst component was prepared according to the procedure described in Example 4, except that the 4.5 ml of γ-methacryloxypropyltriethoxysilane was replaced with 3.0 ml of γ-(2,3-epoxypropoxy)propyltriethoxysilane. The composition of the catalyst component is shown in Table 1 below.

An ethylene polymerization was carried out according to the procedure described in Example 1. The properties of the resulting polyethylene were measured and the results are shown in Table 2 below.

Example 10

A catalyst component was prepared according to the procedure described in Example 9, except that the γ-(2,3-epoxypropoxy)propyltriethoxysilane was replaced with 3.0 ml of γ-(2,3-epoxypropoxy)propyltrimethoxysilane. The composition of the catalyst component is shown in Table 1 below.

An ethylene polymerization was carried out according to the procedure described in Example 1. The properties of the resulting polyethylene were measured and the results are shown in Table 2 below.

Example 11

To a reactor, in which air had been repeatedly purged with pure $N_2$, were charged successively 4.03 g of anhydrous magnesium dichloride, 50 ml of toluene, 2.0 ml of epoxy chloropropane, 6.0 ml of tributyl borate, and 3.4 ml of ethanol. The reaction mixture was heated with stirring to 68° C. After the solids had been dissolved, the mixture was further maintained at 68° C. for 1 hour. The reaction mixture was cooled to −5° C., 60 ml of $TiCl_4$ was added dropwise thereto, and then 4.5 ml of γ-chloropropyltriethoxysilane was added thereto. The reaction mixture was allowed to react for 1 hour, and then heated slowly to 80° C. and further maintained at the temperature of 80° C. for 2 hours. The stirrer was stopped, and solids in the reaction mixture settled down quickly. Supernatant was filtered off. The residual solids were washed with toluene twice and with hexane four times, and then dried under a high pure $N_2$ flow, to give a free-flowing solid catalyst component. The composition of the catalyst component is shown in Table 1 below.

An ethylene polymerization was carried out according to the procedure described in Example 1. The properties of the resulting polyethylene were measured and the results are shown in Table 2 below.

Example 12

To a reactor, in which air had been repeatedly purged with pure $N_2$, were charged successively 4.0 g of anhydrous magnesium dichloride, 50 ml of toluene, 6.0 ml of epoxy chloropropane, 4.0 ml of tributyl phosphate, and 5.6 ml of ethanol. The reaction mixture was heated with stirring to 70° C. After the solids had been dissolved, the mixture was further maintained at 70° C. for 1 hour. The reaction mixture was cooled to 30° C., 4.8 ml of 2.2 M solution of diethyl aluminum chloride in hexane was added dropwise thereto, and the mixture was allowed to react at 30° C. for 1 hour. Then the reaction mixture was cooled to −5° C., 40 ml of $TiCl_4$ was added dropwise thereto, and then 3.0 ml of γ-(N,N-dimethylaminopropyl) triethoxysilane was added thereto. The reaction mixture was allowed to react for 1 hour, and then heated slowly to 80° C. and further maintained at the temperature of 80° C. for 2 hours. The stirrer was stopped, and solids in the reaction mixture settled down quickly. Supernatant was filtered off. The residual solids were washed with toluene twice and with hexane four times, and then dried under a pure $N_2$ flow, to give a free-flowing solid catalyst component. The composition of the catalyst component is shown in Table 1 below.

An ethylene polymerization was carried out according to the procedure described in Example 1. The properties of the resulting polyethylene were measured and the results are shown in Table 2 below.

Comparative Example 1

A catalyst component was prepared according to the procedure described in Example 1, except that the γ-(N,N-dimethylaminopropyl)triethoxy silane was replaced with 2.0 g of phthalic anhydride. The composition of the catalyst component is shown in Table 1 below.

An ethylene polymerization was carried out according to the procedure described in Example 1. The properties of the resulting polyethylene were measured and the results are shown in Table 2 below.

Comparative Example 2

To a reactor, in which air had been repeatedly purged with pure $N_2$, were charged successively 4.0 g of anhydrous magnesium dichloride, 50 ml of toluene, 6.0 ml of epoxy chloropropane, 6.0 ml of tributyl borate, and 5.6 ml of ethanol. The reaction mixture was heated with stirring to 70° C. After the solids had been dissolved, the mixture was further maintained at 70° C. for 1 hour. The reaction mixture was cooled to −5° C., and 40 ml of $TiCl_4$ was added dropwise thereto. The reaction mixture was allowed to react for 1 hour, and then heated slowly to 80° C. and further maintained at the temperature of 80° C. for 2 hours. The stirrer was stopped, and it was observed that solids in the reaction mixture were difficult to settle down. When the reaction mixture was filtered through 400 mesh Nylon cloth, no solid catalyst component was obtained.

TABLE 1

Composition of Catalyst Components

| No. | Ti (wt %) | Mg (wt %) | Cl (wt %) | Si (wt %) | Alkoxy group OR (wt %) |
|---|---|---|---|---|---|
| Ex. 1 | 6.5 | 16.0 | 58.8 | 0.2 | 6.7 |
| Ex. 2 | 5.9 | 16.0 | 58.0 | 0.2 | 6.4 |
| Ex. 3 | 6.3 | 15.6 | 59.0 | 0.3 | 6.5 |
| Ex. 4 | 5.8 | 16.1 | 60.8 | 0.3 | 6.3 |
| Ex. 5 | 5.9 | 17.0 | 59.0 | 0.2 | 6.1 |
| Ex. 6 | 5.8 | 16.2 | 61.0 | 0.3 | 5.9 |
| Ex. 7 | 6.0 | 16.0 | 60.0 | 0.4 | 6.4 |
| Ex. 8 | 6.1 | 16.8 | 62.0 | 0.2 | 6.3 |
| Ex. 9 | 5.9 | 16.0 | 60.0 | 0.4 | 6.3 |
| Ex. 10 | 6.2 | 16.0 | 60.0 | 0.3 | 6.3 |
| Ex. 11 | 6.0 | 16.0 | 59.9 | 0.3 | 6.2 |
| Ex. 12 | 6.5 | 16.0 | 58.8 | 0.2 | 6.7 |
| Comparative Ex. 1 | 5.5 | 16.0 | 60.0 | / | / |

TABLE 2

Performance of Catalysts

| No. | Activity* $10^4$ gPE/gcat | BD** g/cm$^{-3}$ | $MI_{2.16}$*** g/10 min | Particle Size Distribution (mesh) | | | |
|---|---|---|---|---|---|---|---|
| | | | | <20 | 20-100 | 100-200 | >200 |
| Ex. 1 | 4.8 | 0.33 | 0.61 | 0.8 | 63.4 | 35.1 | 0.7 |
| Ex. 2 | 4.3 | 0.32 | 0.55 | 1.3 | 64.3 | 33.8 | 0.6 |
| Ex. 3 | 4.2 | 0.31 | 0.63 | 0.5 | 64.2 | 34.3 | 1.0 |
| Ex. 4 | 4.1 | 0.33 | 0.80 | 1.3 | 65.6 | 32.8 | 0.3 |
| Ex. 5 | 4.6 | 0.32 | 0.78 | 2.6 | 62.2 | 34.0 | 1.2 |
| Ex. 6 | 4.5 | 0.31 | 0.66 | 4.1 | 69.5 | 35.6 | 0.8 |
| Ex. 7 | 4.3 | 0.32 | 0.61 | 0.7 | 66.5 | 32.1 | 0.7 |
| Ex. 8 | 4.2 | 0.31 | 0.67 | 2.2 | 61.7 | 35.2 | 0.9 |
| Ex. 9 | 4.1 | 0.36 | 0.70 | 0.5 | 63.9 | 35.3 | 0.3 |
| Ex. 10 | 4.9 | 0.35 | 0.59 | 1.7 | 58.0 | 39.9 | 0.4 |
| Ex. 11 | 4.3 | 0.32 | 0.61 | 1.6 | 57.9 | 40.1 | 0.4 |
| Ex. 12 | 4.8 | 0.38 | 0.60 | 0.8 | 63.4 | 35.1 | 0.7 |
| Comparative Ex. 1 | 4.0 | 0.30 | 0.42 | 12.1 | 47.9 | 37.8 | 2.2 |

*Polymerization conditions: temperature: 80° C.; pressure: 0.73 MPa; $H_2/C_2H_4$ = 0.28/0.45 ("PE" means polyethylene; "cat" means catalyst);
**"BD" means bulk density;
***Measured according to ASTM D1238-99, at 190° C. and 2.16 kg load. ("MI" means melt index).

It can be seen from the data shown in Table 2 that the catalysts according to the present disclosure had acceptable activities and give rise to polymer powders having acceptably narrow particle size distribution and an acceptable amount of fines having a diameter of less than 74 microns (i.e., greater than 200 mesh), compared with the catalyst of Comparative Example 1.

While the invention has been described with reference to exemplary embodiments, it will be understood by those skilled in the art that various changes and modifications may be made.

What is claimed is:

1. A catalyst component, comprising at least one entity chosen from reaction products of
   (1) at least one magnesium complex obtained by dissolving at least one magnesium halide in at least one solvent system,
   wherein the at least one solvent system comprises at least one organic epoxy compound, at least one organic boron compound, at least one alcohol, and optionally at least one inert diluent, or comprises at least one organic epoxy compound, at least one organophosphorus compound, at least one alcohol, and optionally at least one inert diluent,
   wherein the at least one alcohol is chosen from optionally halogenated linear $C_1$-$C_{10}$ alkyl alcohols, optionally halogenated branched $C_3$-$C_{10}$ alkyl alcohols, optionally halogenated $C_3$-$C_{10}$ cycloalkyl alcohols, optionally halogenated $C_6$-$C_{20}$ aryl alcohols, optionally halogenated $C_7$-$C_{20}$ aralkyl alcohols, and optionally halogenated $C_7$-$C_{20}$ alkaryl alcohols;
   (2) at least one titanium compound of formula $Ti(OR)_aX_b$, wherein R, which may be the same or different, is chosen from $C_1$-$C_{14}$ hydrocarbyl groups, X, which may be the same or different, is chosen from halogens, a is 0, 1, 2, 3 or 4, b is 1, 2, 3 or 4, and a+b=3 or 4; and (3) at least one organic silicon compound of formula (I):

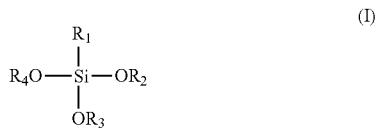

wherein $R_1$ is chosen from $C_3$-$C_{20}$ aliphatic hydrocarbyl groups, and is substituted with at least one substituent chosen from halogens, $C_1$-$C_6$ acyloxy groups, epoxy group, amino group, $C_1$-$C_6$ alkylamino groups, di($C_1$-$C_6$ alkyl)amino groups, $C_1$-$C_6$ alkoxy groups, glycidoxy group, and oxo group; $R_2$, $R_3$ and $R_4$, which may be the same or different, are each chosen from $C_1$-$C_{10}$ aliphatic hydrocarbyl, $C_3$-$C_{10}$ alicyclic hydrocarbyl, $C_6$-$C_{10}$ aryl, $C_7$-$C_{10}$ aralkyl, and $C_7$-$C_{10}$ alkaryl groups, said reaction products being useful as catalyst components for ethylene polymerization.

2. The catalyst component of claim 1, wherein the at least one organic boron compound is of formula (II):

wherein R, which may be the same or different, is chosen from $C_1$-$C_{20}$ linear alkyl, $C_3$-$C_{20}$ branched alkyl, $C_3$-$C_{20}$ cycloalkyl, $C_6$-$C_{20}$ aryl, $C_7$-$C_{20}$ aralkyl, and $C_7$-$C_{20}$ alkaryl groups.

3. The catalyst component of claim 2, wherein in the formula (II), R is chosen from $C_1$-$C_{20}$ linear alkyl groups.

4. The catalyst component of claim 1, wherein the at least one organic epoxy compound is chosen from aliphatic epoxy compounds and diepoxy compounds, halogenated aliphatic epoxy compounds and diepoxy compounds, glycidyl ether, and inner ethers, each comprising from 2 to 8 carbon atoms.

5. The catalyst component of claim 1, wherein the at least one organophosphorus compound is chosen from hydrocarbyl esters of phosphoric acid, halogenated hydrocarbyl esters of phosphoric acid, hydrocarbyl esters of phosphorous acid, and halogenated hydrocarbyl esters of phosphorous acid.

6. The catalyst component of claim 1, wherein in the formula (I), $R_1$ is chosen from $C_3$-$C_{20}$ linear and branched alkyl groups, and is substituted with at least one substituent chosen from Cl, Br, $C_1$-$C_6$ acyloxy groups, epoxy group, amino group, $C_1$-$C_6$ alkylamino groups, di($C_1$-$C_6$ alkyl)amino groups, $C_1$-$C_6$ alkoxy groups, glycidoxy group, and oxo group; and $R_2$, $R_3$ and $R_4$ are each chosen from $C_1$-$C_{10}$ linear alkyl, $C_3$-$C_{10}$ branched alkyl, and $C_3$-$C_{10}$ cycloalkyl groups.

7. The catalyst component of claim 1, wherein the at least one organic silicon compound is chosen from γ-chloropropyltrimethoxysilane, γ-chlorobutyltrimethoxysilane, γ-chlorohexyltrimethoxysilane, γ-chlorooctyltrimethoxysilane, γ-chloropropyltriethoxysilane, γ-chlorobutyltriethoxysilane, γ-chlorohexyltriethoxysilane, γ-chlorooctyltriethoxysilane, γ-chloropropyltributoxysilane, γ-chlorobutyltributoxysilane, γ-chlorohexyltributoxysilane, γ-chlorooctyltributoxysilane, γ-acryloxypropyltrimethoxysilane, γ-acryloxybutyltrimethoxysilane, γ-acryloxyhexyltrimethoxysilane, γ-acryloxyoctyltrimethoxysilane, γ-acryloxypropyltriethoxysilane, γ-acryloxybutyltriethoxysilane, γ-acryloxyhexyltriethoxysilane, γ-acryloxyoctyltriethoxysilane, γ-acryloxypropyltributoxysilane, γ-acryloxybutyltributoxysilane, γ-acryloxyhexyltributoxysilane, γ-acryloxyoctyltributoxysilane, γ-methacryloxypropyltrimethoxysilane, γ-methacryloxybutyltrimethoxysilane, γ-methacryloxyhexyltrimethoxysilane, γ-methacryloxyoctyltrimethoxysilane, γ-methacryloxypropyltriethoxysilane, γ-methacryloxybutyltriethoxysilane, γ-methacryloxyhexyltriethoxysilane, γ-methacryloxyoctyltriethoxysilane, γ-methacryloxypropyltributoxysilane, γ-methacryloxybutyltributoxysilane, γ-methacryloxyhexyltributoxysilane, γ-methacryloxyoctyltributoxysilane, γ-(2,3-epoxypropoxy)propyltrimethoxysilane, γ-(2,3-epoxypropoxy)butyltrimethoxysilane, γ-(2,3-epoxypropoxy)hexyltrimethoxysilane, γ-(2,3-epoxypropoxy)octyltrimethoxysilane, γ-(2,3-epoxypropoxy)propyltriethoxysilane, γ-(2,3-epoxypropoxy)butyltriethoxysilane, γ-(2,3-epoxypropoxy)hexyltriethoxysilane, γ-(2,3-epoxypropoxy)octyltriethoxysilane, γ-(2,3-epoxypropoxy)propyltributoxysilane, γ-(2,3-epoxypropoxy)butyltributoxysilane, γ-(2,3-epoxypropoxy)hexyltributoxysilane, γ-(2,3-epoxypropoxy)octyltributoxysilane, γ-(N,N-dimethylaminopropyl)trimethoxysilane, γ-(N,N-diethylaminopropyl)trimethoxysilane, γ-(N,N-dipropylaminopropyl)trimethoxysilane, γ-(N,N-dibutylaminopropyl)trimethoxysilane, γ-(N,N-dimethylaminopropyl)triethoxysilane, γ-(N,N-diethylaminopropyl)triethoxysilane, γ-(N,N-dipropylaminopropyl)triethoxysilane, γ-(N,N-dibutylaminopropyl)triethoxysilane, γ-(N,N-dimethylaminopropyl)tributoxysilane, γ-(N,N-diethylaminopropyl)tributoxysilane, γ-(N,N-dipropylaminopropyl)tributoxysilane, γ-(N,N-dibutylaminopropyl)tributoxysilane, γ-(N,N-dimethylaminopropyl)trihexyloxysilane, γ-(N,N-diethylaminopropyl)trihexyloxysilane, γ-(N,N-dipropylaminopropyl)trihexyloxysilane, γ-(N,N-dibutylaminopropyl)trihexyloxysilane, γ-(N,N-dimethylaminopropyl)trioctyloxysilane, γ-(N,N-diethylaminopropyl)trioctyloxysilane, γ-(N,N-dipropylaminopropyl)trioctyloxysilane, and γ-(N,N-dibutylaminopropyl)trioctyloxysilane.

8. The catalyst component of claim 1, wherein the at least one magnesium halide is chosen from magnesium dihalides, hydrates of magnesium dihalides, alcohol complexes of magnesium dihalides, and derivatives of magnesium dihalides wherein one halogen atom in the magnesium dihalides is replaced with an alkoxy or a halogenated alkoxy group.

9. The catalyst component of claim 1, wherein relative to one mole of the magnesium halide in the component (1), the amounts of the individual substance used are as follows: 1.0 to 15.0 moles for the organic epoxy compound, 0.1 to 10.0 moles for the organic boron compound or the organophosphorus compound, 0.05-1.0 moles for the alcohol compound, 1.0-15.0 moles for the organic silicon compound, and 0.5-10.0 moles for the titanium compound.

10. A process for preparing a catalyst component comprising at least one entity chosen from reaction products of
    (a) at least one magnesium complex obtained by dissolving at least one magnesium halide in at least one solvent system;
    wherein the at least one solvent system comprises at least one organic epoxy compound, at least one organic boron compound, at least one alcohol, and optionally at least one inert diluent, or comprises at least one organic epoxy compound, at least one organophosphorus compound, at least one alcohol, and optionally at least one inert diluent, wherein the at least one alcohol is chosen from optionally halogenated linear $C_1$-$C_{10}$ alkyl alcohols, optionally halogenated branched $C_3$-$C_{10}$ alkyl alcohols, optionally halogenated $C_3$-$C_{10}$ cycloalkyl alcohols, optionally $C_6$-$C_{20}$ aryl alcohols, optionally halogenated $C_7$-$C_{20}$ aralkyl alcohols, and optionally halogenated $C_7$-$C_{20}$ alkaryl alcohols;

(b) at least one titanium compound of formula Ti(OR)$_a$X$_b$, wherein R, which may be the same or different, is chosen from $C_1$-$C_{14}$ hydrocarbyl groups, X, which may be the same or different, is chosen from halogens, a is 0, 1, 2, 3 or 4, b is 1, 2, 3 or 4, and a+b=3 or 4; and (c) at least one organic silicon compound of formula (I):

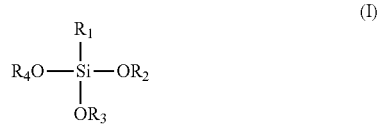

wherein $R_1$ is chosen from $C_3$-$C_{20}$ aliphatic hydrocarbyl groups, and is substituted with at least one substituent chosen from halogens, $C_1$-$C_6$ acyloxy groups, epoxy group, amino group, $C_1$-$C_6$ alkylamino groups, di($C_1$-$C_6$ alkyl)amino groups, $C_1$-$C_6$ alkoxy groups, glycidoxy group, and oxo group; $R_2$, $R_3$ and $R_4$, which may be the same or different, are each chosen from $C_1$-$C_{10}$ aliphatic hydrocarbyl, $C_3$-$C_{10}$ alicyclic hydrocarbyl, $C_6$-$C_{10}$ aryl, $C_7$-$C_{10}$ aralkyl, and $C_7$-$C_{10}$ alkaryl groups, said reaction products being useful as catalyst components for ethylene polymerization; comprising (1) dissolving the at least one magnesium halide in the at least one solvent system to form a solution;

(2) combining the solution of operation (1) with the at least one titanium compound and the at least one organic silicon compound at a temperature ranging from −40° C. to 10° C. to form a mixture;

(3) heating the mixture of operation (2) to a temperature ranging from 40° C. to 120° C. and maintaining at that temperature for a period of time, to precipitate solids; and (4) recovering the solids as the catalyst component.

11. The process of claim 10, wherein the temperature for the dissolving operation (1) ranges from 40° C. to 100° C.

12. A catalyst comprising at least one entity chosen from reaction products of:

(1) at least one catalyst component comprising at least one entity chosen from reaction products of (a) at least one magnesium complex obtained by dissolving at least one magnesium halide in at least one solvent system, wherein the at least one solvent system comprises at least one organic epoxy compound, at least one organic boron compound, at least one alcohol, and optionally at least one inert diluent, or comprises at least one organic epoxy compound, at least one organophosphorus compound, at least one alcohol, and optionally at least one inert diluent, wherein the at least one alcohol is chosen from optionally halogenated linear $C_1$-$C_{10}$ alkyl alcohols, optionally halogenated branched $C_3$-$C_{10}$ alkyl alcohols, optionally halogenated $C_3$-$C_{10}$ cycloalkyl alcohols, optionally halogenated $C_6$-$C_{20}$ aryl alcohols, optionally halogenated $C_7$-$C_{20}$ aralkyl alcohols, and optionally halogenated $C_7$-$C_{20}$ alkaryl alcohols;

(b) at least one titanium compound of formula Ti(OR)$_a$X$_b$, wherein R, which may be the same or different, is chosen from $C_1$-$C_{14}$ hydrocarbyl groups, X, which may be the same or different, is chosen from halogens, a is 0, 1, 2, 3 or 4, b is 1, 2, 3 or 4, and a+b=3 or 4; and (c) at least one organic silicon compound of formula (I):

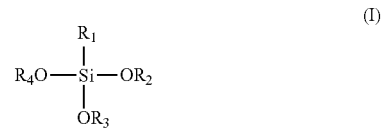

wherein $R_1$ is chosen from $C_3$-$C_{20}$ aliphatic hydrocarbyl groups, and is substituted with at least one substituent chosen from halogens, $C_1$-$C_6$ acyloxy groups, epoxy group, amino group, $C_1$-$C_6$ alkylamino groups, di($C_1$-$C_6$ alkyl)amino groups, $C_1$-$C_6$ alkoxy groups, glycidoxy group, and oxo group; $R_2$, $R_3$ and $R_4$, which may be the same or different, are each chosen from $C_1$-$C_{10}$ aliphatic hydrocarbyl, $C_3$-$C_{10}$ alicyclic hydrocarbyl, $C_6$-$C_{10}$ aryl, $C_7$-$C_{10}$ aralkyl, and $C_7$-$C_{10}$ alkaryl groups, said reaction products being useful as catalyst components for ethylene polymerization; and (2) at least one organic aluminum compound of formula AlR$_n$X$_{3-n}$, wherein R, which may be the same or different, is chosen from $C_1$-$C_{20}$ hydrocarbyl groups, X, which may be the same of different, is chosen from hydrogen and halogens, and n has a value satisfying $1 \leq n \leq 3$, wherein said catalyst is useful for ethylene polymerization.

13. A catalyst comprising:

(1) at least one catalyst component comprising at least one entity chosen from reaction products of (a) at least one magnesium complex obtained by dissolving at least one magnesium halide in at least one solvent system, wherein the at least one solvent system comprises at least one organic epoxy compound, at least one organic boron compound, at least one alcohol, and optionally at least one inert diluent, or comprises at least one organic epoxy compound, at least one organophosphorus compound, at least one alcohol, and optionally at least one inert diluent, wherein the at least one alcohol is chosen from optionally halogenated linear $C_1$-$C_{10}$ alkyl alcohols, optionally halogenated branched $C_3$-$C_{10}$ alkyl alcohols, optionally halogenated $C_3$-$C_{10}$ cycloalkyl alcohols, optionally halogenated $C_6$-$C_{20}$ aryl alcohols, optionally halogenated $C_7$-$C_{20}$ aralkyl alcohols, and optionally halogenated $C_7$-$C_{20}$ alkaryl alcohols;

(b) at least one titanium compound of formula Ti(OR)$_a$X$_b$, wherein R, which may be the same or different, is chosen from $C_1$-$C_{14}$ hydrocarbyl groups, X, which may be the same or different, is chosen from halogens, a is 0, 1, 2, 3 or 4, b is 1, 2, 3 or 4, and a+b=3 or 4; and (c) at least one organic silicon compound of formula (I):

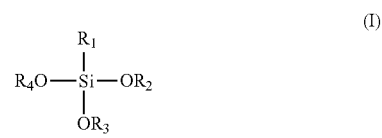

wherein $R_1$ is chosen from $C_3$-$C_{20}$ aliphatic hydrocarbyl groups, and is substituted with at least one substituent chosen from halogens, $C_1$-$C_6$ acyloxy groups, epoxy group, amino group, $C_1$-$C_6$ alkylamino groups, di($C_1$-$C_6$ alkyl)amino groups, $C_1$-$C_6$ alkoxy groups, glycidoxy group, and oxo group; $R_2$, $R_3$ and $R_4$, which may be the same or different, are each chosen from $C_1$-$C_{10}$ aliphatic hydrocarbyl, $C_3$-$C_{10}$ alicyclic hydrocarbyl, $C_6$-$C_{10}$ aryl, $C_7$-$C_{10}$ aralkyl, and $C_7$-$C_{10}$ alkaryl groups, said reaction products being useful as catalyst components for ethylene polymerization; and (2) at least one co-catalyst;

wherein said catalyst is useful for ethylene polymerization.

14. A process for polymerization of ethylene, comprising
(i) contacting, under polymerization conditions, ethylene and optionally at least one $C_3$-$C_{20}$ α-olefin as a comonomer with a catalyst comprising at least one entity chosen from reaction products of:
(1) at least one catalyst component comprising at least one entity chosen from reaction products of
(a) at least one magnesium complex obtained by dissolving at least one magnesium halide in at least one solvent system,
wherein the at least one solvent system comprises at least one organic epoxy compound, at least one organic boron compound, at least one alcohol, and optionally at least one inert diluent, or comprises at least one organic epoxy compound, at least one organophosphorus compound, at least one alcohol, and optionally at least one inert diluent,
wherein the at least one alcohol is chosen from optionally halogenated linear $C_1$-$C_{10}$ alkyl alcohols, optionally halogenated branched $C_3$-$C_{10}$ alkyl alcohols, optionally halogenated $C_3$-$C_{10}$ cycloalkyl alcohols, optionally halogenated $C_6$-$C_{20}$ aryl alcohols, optionally halogenated $C_7$-$C_{20}$ aralkyl alcohols, and optionally halogenated $C_7$-$C_{20}$ alkaryl alcohols;
(b) at least one titanium compound of formula $Ti(OR)_aX_b$, wherein R, which may be the same or different, is chosen from $C_1$-$C_{14}$ hydrocarbyl groups, X, which may be the same or different, is chosen from halogens, a is 0, 1, 2, 3 or 4, b is 1, 2, 3 or 4, and a+b=3 or 4; and
(c) at least one organic silicon compound of formula (I):

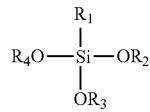
(I)

wherein $R_1$ is chosen from $C_3$-$C_{20}$ aliphatic hydrocarbyl groups, and is substituted with at least one substituent chosen from halogens, $C_1$-$C_6$ acyloxy groups, epoxy group, amino group, $C_1$-$C_6$ alkylamino groups, di($C_1$-$C_6$ alkyl)amino groups, $C_1$-$C_6$ alkoxy groups, glycidoxy group, and oxo group; $R_2$, $R_3$ and $R_4$, which may be the same or different, are each chosen from $C_1$-$C_{10}$ aliphatic hydrocarbyl, $C_3$-$C_{10}$ alicyclic hydrocarbyl, $C_6$-$C_{10}$ aryl, $C_7$-$C_{10}$ aralkyl, and $C_7$-$C_{10}$ alkaryl groups; and (2) at least one organic aluminum compound of formula $AlR_nX_{3-n}$, wherein R, which may be the same or different, is chosen from $C_1$-$C_{20}$ hydrocarbyl groups, X, which may be the same of different, is chosen from hydrogen and halogens, and n has a value satisfying $1 \leq n \leq 3$, for a time sufficient to polymerize said ethylene; and (ii) recovering the resulting ethylene polymer.

15. A process for polymerization of ethylene, comprising
(i) contacting, under polymerization conditions, ethylene and optionally at least one $C_3$-$C_{20}$ α-olefin as a comonomer with a catalyst comprising:
(1) at least one catalyst component comprising at least one entity chosen from reaction products of
(a) at least one magnesium complex obtained by dissolving at least one magnesium halide in at least one solvent system,
wherein the at least one solvent system comprises at least one organic epoxy compound, at least one organic boron compound, at least one alcohol, and optionally at least one inert diluent, or comprises at least one organic epoxy compound, at least one organophosphorus compound, at least one alcohol, and optionally at least one inert diluent,
wherein the at least one alcohol is chosen from optionally halogenated linear $C_1$-$C_{10}$ alkyl alcohols, optionally halogenated branched $C_3$-$C_{10}$ alkyl alcohols, optionally halogenated $C_3$-$C_{10}$ cycloalkyl alcohols, optionally halogenated $C_6$-$C_{20}$ aryl alcohols, optionally halogenated $C_7$-$C_{20}$ aralkyl alcohols, and optionally halogenated $C_7$-$C_{20}$ alkaryl alcohols;
(b) at least one titanium compound of formula $Ti(OR)_aX_b$, wherein R, which may be the same or different, is chosen from $C_1$-$C_{14}$ hydrocarbyl groups, X, which may be the same or different, is chosen from halogens, a is 0, 1, 2, 3 or 4, b is 1, 2, 3 or 4, and a+b=3 or 4; and
(c) at least one organic silicon compound of formula (I):

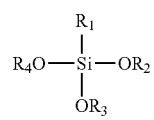
(I)

wherein $R_1$ is chosen from $C_3$-$C_{20}$ aliphatic hydrocarbyl groups, and is substituted with at least one substituent chosen from halogens, $C_1$-$C_6$ acyloxy groups, epoxy group, amino group, $C_1$-$C_6$ alkylamino groups, di($C_1$-$C_6$ alkyl)amino groups, $C_1$-$C_6$ alkoxy groups, glycidoxy group, and oxo group; $R_2$, $R_3$ and $R_4$, which may be the same or different, are each chosen from $C_1$-$C_{10}$ aliphatic hydrocarbyl, $C_3$-$C_{10}$ alicyclic hydrocarbyl, $C_6$-$C_{10}$ aryl, $C_7$-$C_{10}$ aralkyl, and $C_7$-$C_{10}$ alkaryl groups; and (2) at least one co-catalyst, for a time sufficient to polymerize said ethylene; and (ii) recovering the resulting ethylene polymer.

* * * * *